(12) United States Patent
Lane et al.

(10) Patent No.: US 12,464,026 B2
(45) Date of Patent: Nov. 4, 2025

(54) SECURITY ENGINE FOR APPLICATION DEPLOYMENT PIPELINES

(71) Applicant: Capital One Services, LLC, McLean, VA (US)

(72) Inventors: Alexander Lane, New York, NY (US); Andrew Eshman, Fairfax, VA (US); Ibrahima Mbaye, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 102 days.

(21) Appl. No.: 18/425,835

(22) Filed: Jan. 29, 2024

(65) Prior Publication Data

US 2025/0247432 A1 Jul. 31, 2025

(51) Int. Cl.
*H04L 9/40* (2022.01)

(52) U.S. Cl.
CPC .......... *H04L 63/20* (2013.01); *H04L 63/1433* (2013.01)

(58) Field of Classification Search
CPC ............................ H04L 63/20; H04L 63/1433
USPC ......................................... 726/22, 23, 24, 25
See application file for complete search history.

(56) References Cited

U.S. PATENT DOCUMENTS

| | | | | |
|---|---|---|---|---|
| 11,528,283 B2* | 12/2022 | Yadav | ................ | H04L 63/0227 |
| 11,587,688 B2* | 2/2023 | Joao | .................... | H04L 12/1818 |
| 11,601,423 B2* | 3/2023 | Bud | ........................ | G06F 21/32 |
| 11,762,963 B1* | 9/2023 | Magnuson | ............ | H04L 9/3239 |
| | | | | 726/22 |
| 2009/0307764 A1* | 12/2009 | Isobe | .................... | H04L 9/3231 |
| | | | | 726/25 |
| 2015/0033305 A1* | 1/2015 | Shear | .................. | G06F 21/6245 |
| | | | | 726/11 |

* cited by examiner

*Primary Examiner* — Teshome Hailu
(74) *Attorney, Agent, or Firm* — Harrity & Harrity, LLP (57) ABSTRACT

In some implementations, a device may generate an application creation graphical user interface. The device may receive, via the graphical user interface, one or more user inputs associated with specifying a set of elements of an application; information identifying the application including information identifying the set of elements of the application, each element, of the set of elements, being associated with a corresponding codebase. The device may parse, using at least one security engine of a plurality of security engines, a codebase of an element, of the set of elements, to identify whether the application is associated with a security issue satisfying a threshold severity. The device may generate, based on identifying that the application is associated with the security issue satisfying the threshold severity, a security recommendation relating to the element. The device may transmit an output including information identifying the security recommendation relating to the element.

20 Claims, 7 Drawing Sheets

SECURITY ENGINE FOR APPLICATION DEPLOYMENT PIPELINES

BACKGROUND

Program code may be deployed across a variety of different platforms, such as web platforms, mobile application platforms, enterprise platforms, cloud platforms, or personal computing platforms, among other examples. Each platform may be associated with application programming interfaces (APIs), access restrictions, hardware configurations, firmware configurations, or software configurations, among other examples. As a result of differences between the different platforms, program code, which is deployed across multiple platforms, may be subject to different security vulnerabilities on the different platforms. After application deployment, applications (and the program code thereof) may be monitored to identify security vulnerabilities that are being exploited. Patches (e.g., changes to the program code of an application) may be deployed to fix security vulnerabilities that are being exploited.

SUMMARY

In some implementations, a system for application security management includes one or more memories; and one or more processors, communicatively coupled to the one or more memories, configured to: receive information identifying an application, the information identifying the application including information identifying a set of elements of the application, and each element, of the set of elements, being associated with a corresponding codebase; parse, using at least one security engine of a plurality of security engines, a codebase of an element, of the set of elements, to identify whether the application is associated with a security issue satisfying a threshold severity; generate, based on identifying that the application is associated with the security issue satisfying the threshold severity, a security recommendation relating to the element; and transmit an output including information identifying the security recommendation relating to the element.

In some implementations, a non-transitory computer-readable medium storing a set of instructions includes one or more instructions that, when executed by one or more processors of a device for application security management, cause the device to: receive information identifying an application, the information identifying the application including information identifying a set of elements of the application, and each element, of the set of elements, being associated with a corresponding codebase; parse, using at least one security engine of a plurality of security engines, a codebase of an element, of the set of elements, to identify whether the application is associated with a security issue satisfying a first threshold severity or an efficiency issue satisfying a second threshold severity; generate, based on identifying that the application is associated with the security issue or the efficiency issue satisfying the threshold severity, a security recommendation relating to the element or an efficiency recommendation relating to the element; and transmit an output including information identifying the security recommendation or the efficiency recommendation.

In some implementations, a method for application security management includes generating, by a device, an application creation graphical user interface; receiving, by the device and via the graphical user interface, one or more user inputs associated with specifying a set of elements of an application; information identifying the application including information identifying the set of elements of the application, each element, of the set of elements, being associated with a corresponding codebase; parsing, using at least one security engine of a plurality of security engines, a codebase of an element, of the set of elements, to identify whether the application is associated with a security issue satisfying a threshold severity; generating, based on identifying that the application is associated with the security issue satisfying the threshold severity, a security recommendation relating to the element; and transmitting, by the device, an output including information identifying the security recommendation relating to the element.

DETAILED DESCRIPTION

The following detailed description of example implementations refers to the accompanying drawings. The same reference numbers in different drawings may identify the same or similar elements.

Applications may be deployed across a variety of platforms, such as web platforms, mobile application platforms, enterprise platforms, or personal computer platforms, among other examples. The software development lifecycle for developing such applications can include multiple development steps including authoring program code, testing the program code, deploying the program code, monitoring feedback on the deployed program code, and modifying the program code based on the feedback, among other examples. Similarly, security techniques may be applied throughout the software development lifecycle, such as providing security training, defining security requirements, selecting application designs, implementing the application designs, verifying the implementation, performing pre-release reviews, or performing post-release incident response, among other examples.

When pre-release security fails, applications, which have been deployed to a public user group, can experience security failures, which may result in data breaches, identity theft, service disruptions, compliance issues, intellectual property theft, exploitation of users, loss of customer confidence, or reputational damage, among other examples. Accordingly, it is important that, to the extent possible, security flaws be identified and remediated before software is deployed across a variety of platforms, each of which may be associated with different security risks or vulnerabilities. As program code authorship becomes more widespread, such as via the deployment of easy-to-use programming languages, drag-and-drop user interfaces for authoring program code, or computer generated program code (e.g., such as using large language models (LLMs), many program code authors or, for example, in the case of computer-generated program code reviewers may have minimal training in application security. Additionally, as applications are rapidly deployed across many platforms it may be impractical for program code authors or reviewers to analyze thousands or millions of possible security risks across dozens of platforms. Accordingly, it is becoming increasingly likely that software is being deployed with security risks or vulnerabilities.

Some implementations described herein enable use of a security engine for application deployment pipelines. For example, a security system may receive information identifying an application (e.g., program code for the application) and analyze the application to identify one or more security issues and generate one or more recommendations for mitigating or eliminating the one or more security issues. In some implementations, the security system may be integrated with an application deployment pipeline, such as being connected with a graphical user interface (GUI) for creating web applications or being triggered automatically in connection with a code deployment procedure. In this way, by providing a security engine, the security system reduces a likelihood of deploying software with security risks or vulnerabilities, thereby reducing a likelihood of data breaches, identity theft, service disruptions, compliance issues, intellectual property theft, exploitation of users, loss of customer confidence, or reputational damage, among other examples. Moreover, by providing the security engine, the security system enables security controls to be implemented more rapidly and earlier in a development lifecycle, thereby avoiding minimum viable products being deployed into production without security controls.

Figure 1A:
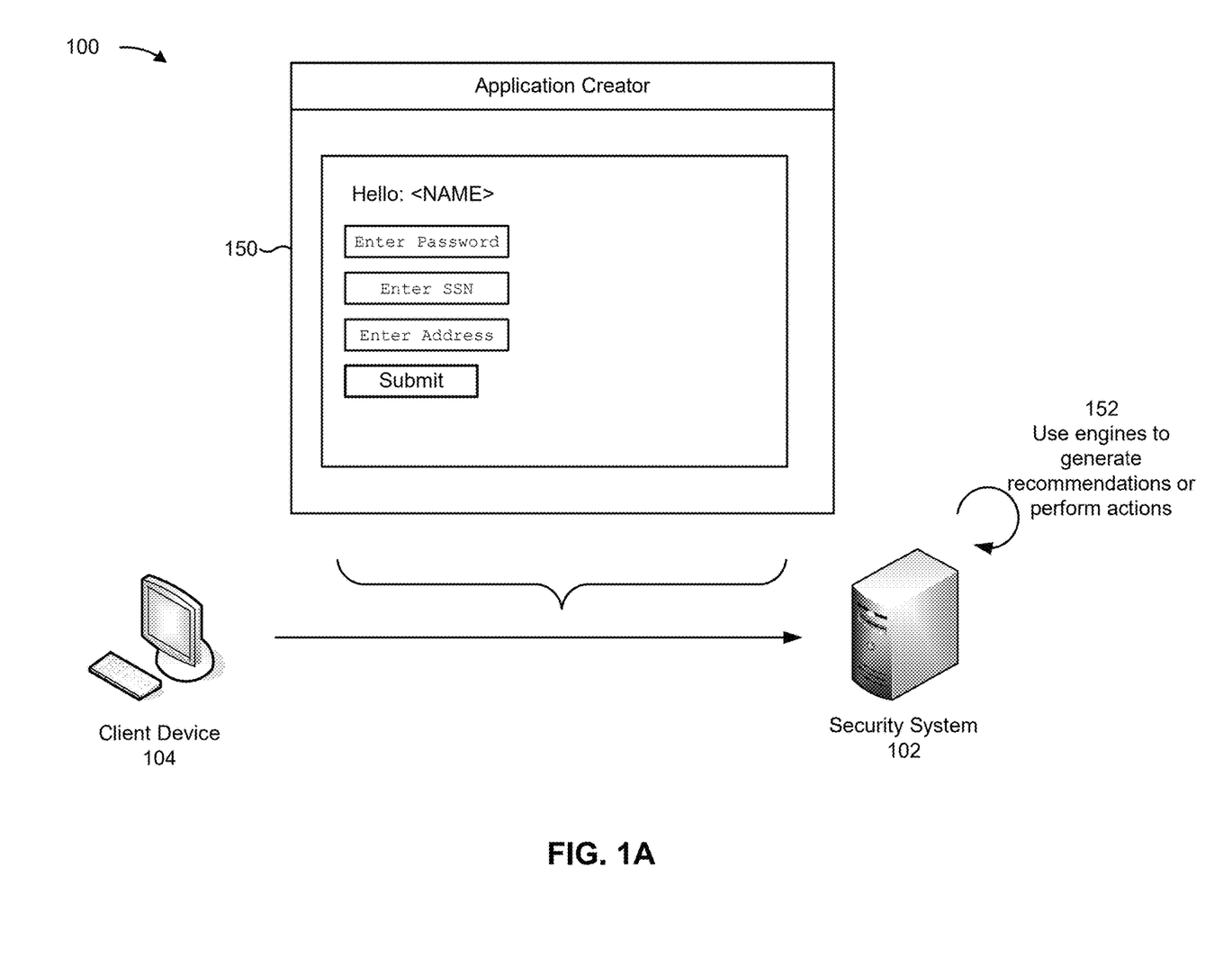
FIGS. 1A-1C are diagrams of an example associated with security engine for application deployment pipelines, in accordance with some embodiments of the present disclosure.
Figure 1B:
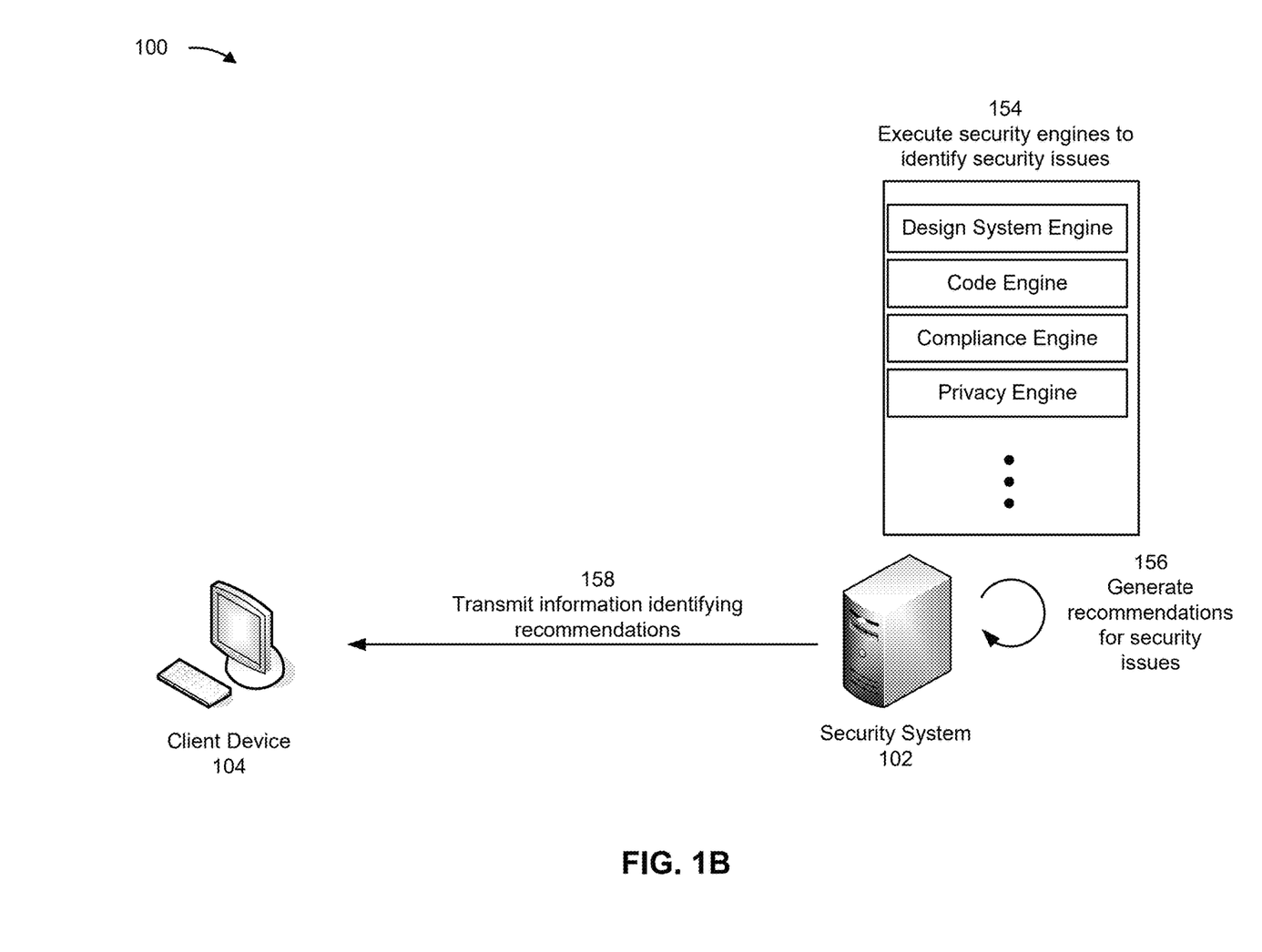
Figure 1C:
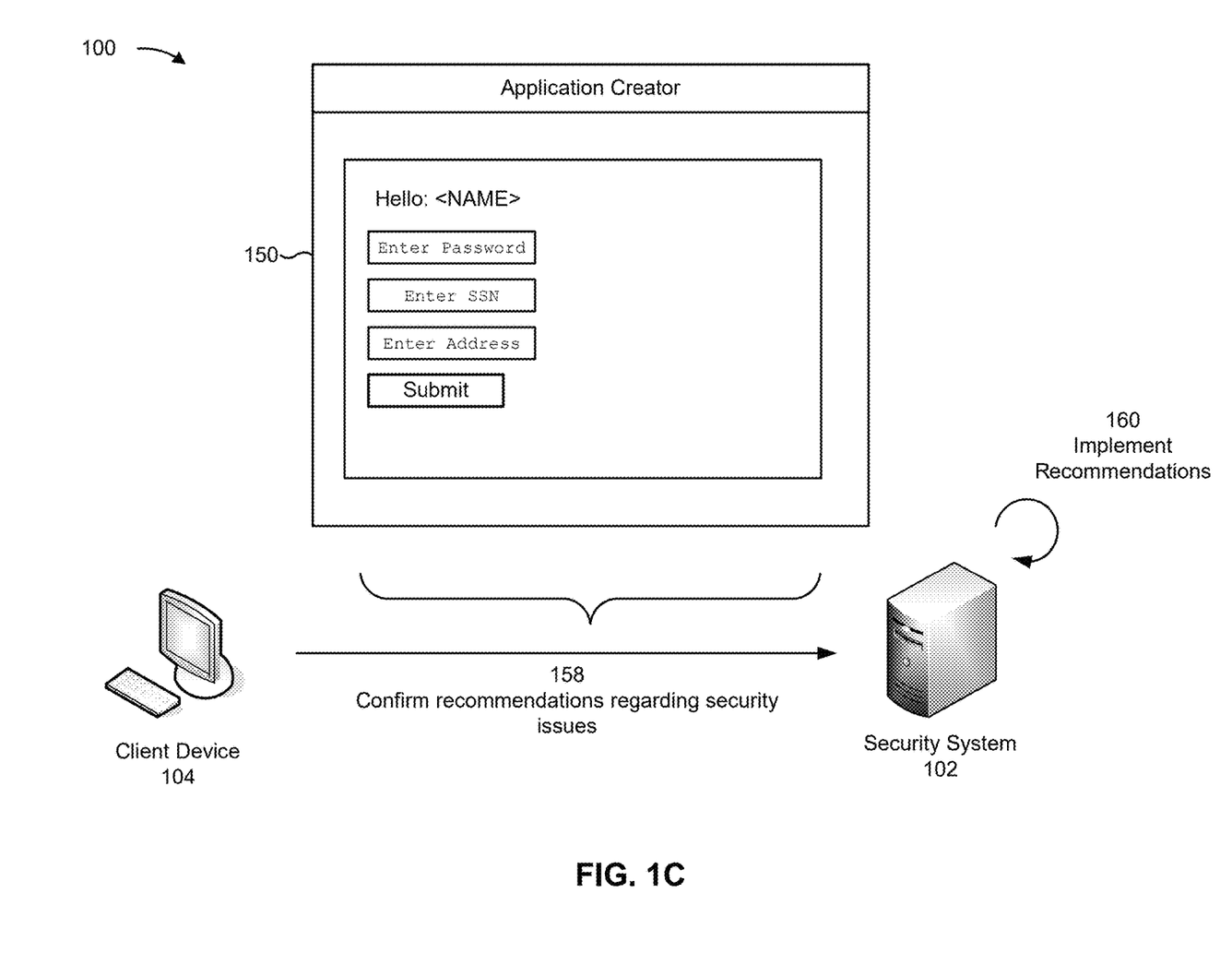

FIGS. 1A-1C are diagrams of an example 100 associated with security engine for application deployment pipelines. As shown in FIGS. 1A-1C, example 100 includes a security system 102 and a client device 104. These devices are described in more detail in connection with FIGS. 3 and 4.

As further shown in FIG. 1A, and by reference number 150, the security system 102 may provide a user interface (UI) with which to generate an application. For example, the security system 102 may cause the client device 104 to provide, for display, a GUI with which an application author may generate an application. In this case, the GUI may enable the application author to provide, via user interactions with the client device 104 and the GUI, program code for execution and/or may enable the application author to select from pre-configured application elements, such as via a drag-and-drop interaction. As shown, the application creator UI may receive selection associated with providing a label (e.g., that displays a "<NAME>" from some linked database, providing a set of text boxes with which to receive text from an application user, and providing a button that can be selected by an application user, as an example.

As further shown in FIG. 1A, and by reference number 152, the security system 102 may use a set of engines to generate recommendations or perform actions by analyzing an application element codebase. For example, the security system 102 may parse a codebase of the application element to extract one or more features from the codebase, as described in more detail herein. In some implementations, the security system 102 may parse a codebase of an application to identify application elements of an application. For example, the security system 102 may extract code representing each UI element that is included in a UI of an application via, for example, a drag-and-drop functionality of a GUI for designing the application. In other words, when a user of a GUI drags a text box element into a UI of an application, the text box element is associated with a code snippet that the security system 102 may extract from a codebase of the application. In some implementations, the security system 102 may access another codebase external to the application or an application element. For example, when an application embeds third party content and calls third party code, the security system 102 may access a codebase associated with the third party code to analyze the third party code for security vulnerabilities.

In some implementations, the security system 102 may analyze application elements from a design perspective. For example, the security system 102 may analyze a design of an application using application elements created in the GUI for designing the application. In this case, the security system 102 may compare the design (e.g., the presence of application elements and/or interconnections therebetween) to other designs (e.g., using one or more engines) to determine to whether there are any security issues from a design perspective. In this way, the security system 102 can generate security guidance or recommendations and/or perform automated actions based on a design of an application rather than based only on a codebase of the application. Although some implementations are described in terms of a design perspective, it is contemplated that the security system 102 may analyze underlying code representing the design in a computer-processable format.

As shown in FIG. 1B, and by reference number 154, the security system 102 may execute a set of security engines to identify one or more security issues. For example, the security system 102 may execute multiple security engines to analyze one or more application elements and one or more codebases, code snippets, or design configurations thereof. In this case, the security system 102 may analyze one or more identified security issues to generate determinations of a predicted severity of a security issue. For example, the security system 102 may determine that a first security issue is associated with a low level of severity and a second security issue is associated with a high level of severity. In this case, the security system 102 may prioritize the second security issue for generating a recommendation based on the second security issue having a threshold severity level (e.g., a high level of severity).

In some implementations, the security system 102 may execute the multiple security engines sequentially. For example, the security system 102 may execute a first security engine followed by a second security engine, which may be executed based on a result of executing the first security engine or independent of the result of executing the first security engine. Additionally, or alternatively, the security system 102 may execute multiple security engines concurrently. For example, the security system 102 may use parallel processing techniques to execute a first security engine and a second security engine in parallel.

In some implementations, the security system 102 may select, for execution, a subset of a set of available security engines. For example, the security system 102 may be configured with security engines applicable to different platforms on which an application can be deployed and may select one or more security engines to execute based on the platform on which the application is to be deployed. Additionally, or alternatively, the security system 102 may execute different security engines based on a phase of a software development lifecycle. For example, the security system 102 may execute a first one or more security engines during a code authoring phase and a second one or more security engines during a pre-release review phase. Additionally, or alternatively, the security system 102 may execute different security engines based on a type of code or a type of design being analyzed or an availability of processing resources. For example, the security system 102 may execute a first one or more security engines when analyzing a first type of code or a first type of design and/or with a large amount of processing resources available and a second one or more security engines when analyzing a second type of code or a second type of design and/or with a relatively small amount of processing resources available.

In some implementations, the security system 102 may execute one or more security engines in real-time. For example, the security system 102 may detect a change to a UI that a user is creating for an application and may execute a security engine on the change to the UI in real-time with the change being made (in other words, when a text box is added, the security system 102 checks code of the text box using a security engine). Additionally, or alternatively, the security system 102 may execute one or more security engines without a change to a UI. In other words, when a user is finished with a portion of a UI, the user may interact with a user interface element to cause the security system 102 to execute one or more security engines on, for example, an entirety of the application elements of the UI (e.g., rather than on a single application element that was just added). Additionally, or alternatively, when a phase of the software development lifecycle is completed, the security system 102 may execute one or more security engines on a codebase or design of an application as a batch process.

In some implementations, the security system 102 may execute design system engine associated with evaluating an element in connection with a design system specification for an application. For example, the security system 102 may parse a design specification for the application and determine whether an element of the application is in accordance with or violates the design specification. In some implementations, the security system 102 may be an entity-specific design specification. For example, the security system 102 may use a design specification specific to an organization that deploying the application. Additionally, or alternatively, the security system 102 may use an open-source design specification. In this case, the security system 102 may analyze the application to identify an open-source design specification that matches a type of the application and may parse the open-source design specification to determine whether the security system 102 complies with the open-source design specification.

In some implementations, the security system 102 may execute a code engine associated with evaluating a potential vulnerability in one or more functions of a codebase of an element. For example, the security system 102 may use the code engine to analyze program code of an application or an application element thereof and determine whether the code is subject to one or more vulnerabilities. As an example, the security system 102 may determine that a text box lacks input validation, which may result in the application allowing code injection attacks among other examples. In some implementations, the security system 102 may identify one or more potential vulnerabilities to detect using the security engine based on receiving information. For example, the security system 102 may receive information identifying security vulnerabilities from, for example, an awareness document publisher that identifies vulnerabilities. Additionally, or alternatively, the security system 102 may parse an attack framework, such as the MITRE ATT&CK® framework to identify a set of vulnerabilities and/or recommendations for mitigating the set of vulnerabilities.

In some implementations, the security system 102 may execute a compliance engine associated with evaluating an element in connection with a compliance specification. For example, the security system 102 may use the compliance engine to determine whether an application or one or more application elements thereof complies with a policy, such as an entity-specific policy, a standards-based policy, or a procedure-based policy. In this case, the security system 102 may parse an entity-specific policy to determine a set of possible violations that can exist for the entity-specific policy and may compare program code or a design of the application with the set of possible violations. Additionally, or alternatively, the security system 102 may access a standards-body server that provides documents identifying standards-based policies and may parse the standards-based policies to determine whether the application is in compliance.

In some implementations, the security system 102 may execute a privacy engine associated with evaluating an element in connection with one or more privacy requirements. For example, the security system 102 may use the privacy engine to determine whether the application is in compliance with one or more privacy standards, such as an international privacy standard, a federal privacy standard, a state or local privacy standard, or a best-practices privacy standard, among other examples. In some implementations, the security system 102 may periodically obtain documents identifying updated privacy standards, such as obtaining a text of a new piece of legislation, and may parse the documents to automatically determine a set of privacy checks to perform on applications that are to be analyzed. For example, the security system 102 may establish and maintain a communication pipeline with a database or server storing security information. In this case, the security system 102 may detect when a change is made to the security information and may obtain an update identifying the change to enable the security system 102 to maintain an up-to-date security engine.

In some implementations, the security system 102 may execute another type of engine associated with evaluating an element of an application. For example, the security system 102 may execute an efficiency engine that analyzes a resource efficiency of elements (e.g., a data storage used by an element, a signaling overhead associated with an element, or a processing requirement associated with an element) in an application according to one or more resource utilization guidelines or a simulation of execution of the application. Additionally, or alternatively, the security system 102 may execute a layout engine that analyzes a legibility of information in a specified layout of an application according to one or more design guidelines of the layout engine.

As further shown in FIG. 1B, and by reference number 156, the security system 102 may generate one or more recommendations for the one or more security issues. For example, the security system 102 may generate a recommendation to mitigate a security issue or eliminate a security issue. In some implementations, the security system 102 may generate the one or more recommendations using a machine learning model. For example, the security system 102 may use a machine learning model to generate or select a security recommendation that is applicable to a security issue identified using a security engine. In one example, when the security system 102 identifies a structured query language (SQL) injection security issue in connection with a presence of an 8-character text box (e.g., for receiving a user name in an application), the security system 102 may generate a recommendation that input validation be performed on text input into the 8-character text box. In this case, the security system 102 may automatically generate code or alter a design to perform the input validation and include information identifying the automatically generated code or the altered design. As another example, when the security system 102 identifies a user enumeration issue (e.g., which may compromise user privacy) in connection with a label element of the application, the security system 102 may recommend that a rate limiter be applied to use of the application to avoid malicious efforts to rapidly scrub a set of user identities using the label. In this case, again, the security system 102 may automatically generate code or suggest a design to rate limit use of the application or refresh of the label.

In some implementations, the security system 102 may generate a recommendation relating to another aspect of the application. For example, the security system 102 may generate a recommendation relating to resource utilization efficiency. As an example, when the security system 102 detects that a 64-character text box is specified for a text input that has a maximum size of 12 characters, the security system 102 may generate a recommendation to switch from using the 64-character text box to using a 16-character text box or another user interface element, thereby reducing a memory size reserved for the text box. In this case, the security system 102 may analyze a design specification of the application (e.g., indicating that a maximum size of the user name is 12 characters) and an application element (e.g., with an attribute indicating that the application element can receive 64 characters and is for receiving a user name) to determine that an efficiency recommendation can be identified and provided. Similarly, the security system 102 may use computer vision to analyze a layout of information using a layout engine, as described herein, and may generate a recommendation to rearrange one or more user interface elements to improve readability or aesthetic balance in accordance with a design specification.

As further shown in FIG. 1B, and by reference number 158, the security system 102 may transmit information identifying the one or more recommendations. For example, the security system 102 may transmit information identifying the one or more recommendations to the client device 104. In some implementations, the security system 102 rank the one or more recommendations when identifying the one or more recommendations. For example, the security system 102 may generate scores for a set of recommendations based on a predicted time or resource intensity to implement a recommendation, a likelihood of the recommendation being effective, a match of the recommendation to a security flaw or efficiency issue, or another factor. In this case, the security system 102 may use the score to select which recommendations to identify and/or an order in which to identify the recommendations.

In some implementations, the security system 102 may generate a document identifying the one or more recommendations. For example, the security system 102 may generate a report document in a particular format, such as a portable document format (PDF), a hypertext markup language (HTML) format, a JavaScript, an extensible markup language (XML) format, a JavaScript object notation (JSON) format, or a comma-separated variable (CSV) format, among other examples. In this case, the security system 102 may transmit the report document to the client device 104 for display or for storage in, for example, a log. Additionally, or alternatively, the security system 102 may control a user interface to transmit an instruction to modify a user interface in connection with identifying the one or more recommendations. For example, the security system 102 may cause the client device 104 to provide an alert in a user interface indicating a security vulnerability and/or an associated recommendation. In this case, the alert may be a presence of one or more indicators (e.g., a pop-up notification) or a change to a user interface element (e.g., highlighting a user interface element, displayed in a GUI, in a particular color), among other examples. Additionally, or alternatively, the security system 102 may transmit an alert to another device, such as flagging the application for additional review by a reviewer or halting a release of the application until a user interface element with a security vulnerability is changed.

As shown in FIG. 1C, and by reference numbers 158 and 160, the security system 102 may receive confirmation of the one or more recommendation and implement the one or more recommendations. For example, the security system 102 may update a codebase to add, remove, or modify an application element (or an application element codebase thereof). In some implementations, the security system 102 may update an application element codebase with generated code based at least in part on the one or more recommendations. For example, the security system 102 may automatically update code of an application, change a type of user interface element in the application, or set one or more attributes of a user interface element in the application, among other examples. Additionally, or alternatively, the security system 102 may generate a record of one or more implementation recommendations and flag the record for direction to one or more developers. In other words, the security system 102 may memorialize a set of implementation recommendations and may automatically generate a task to provide the set of implementation recommendations to developers for use in later phases of a software development project. In this case, the security system 102 may identify a triggering event that, when the triggering event occurs, will cause the security system 102 to provide the set of implementation recommendations to an identified user device and associated developer.

In some implementations, the security system 102 may update a machine learning model based on implementing the recommendation. For example, when a user confirms a recommendation, the security system 102 may update the machine learning model based on the confirmation, thereby providing supervised learning to improve an accuracy of the machine learning model. Additionally, or alternatively, when a user rejects a recommendation (or selects from a plurality of provided recommendations), the security system 102 may use the rejection (or selection) to update the machine learning model.

As indicated above, FIGS. 1A-1C are provided as an example. Other examples may differ from what is described with regard to FIGS. 1A-1C.

Figure 2:
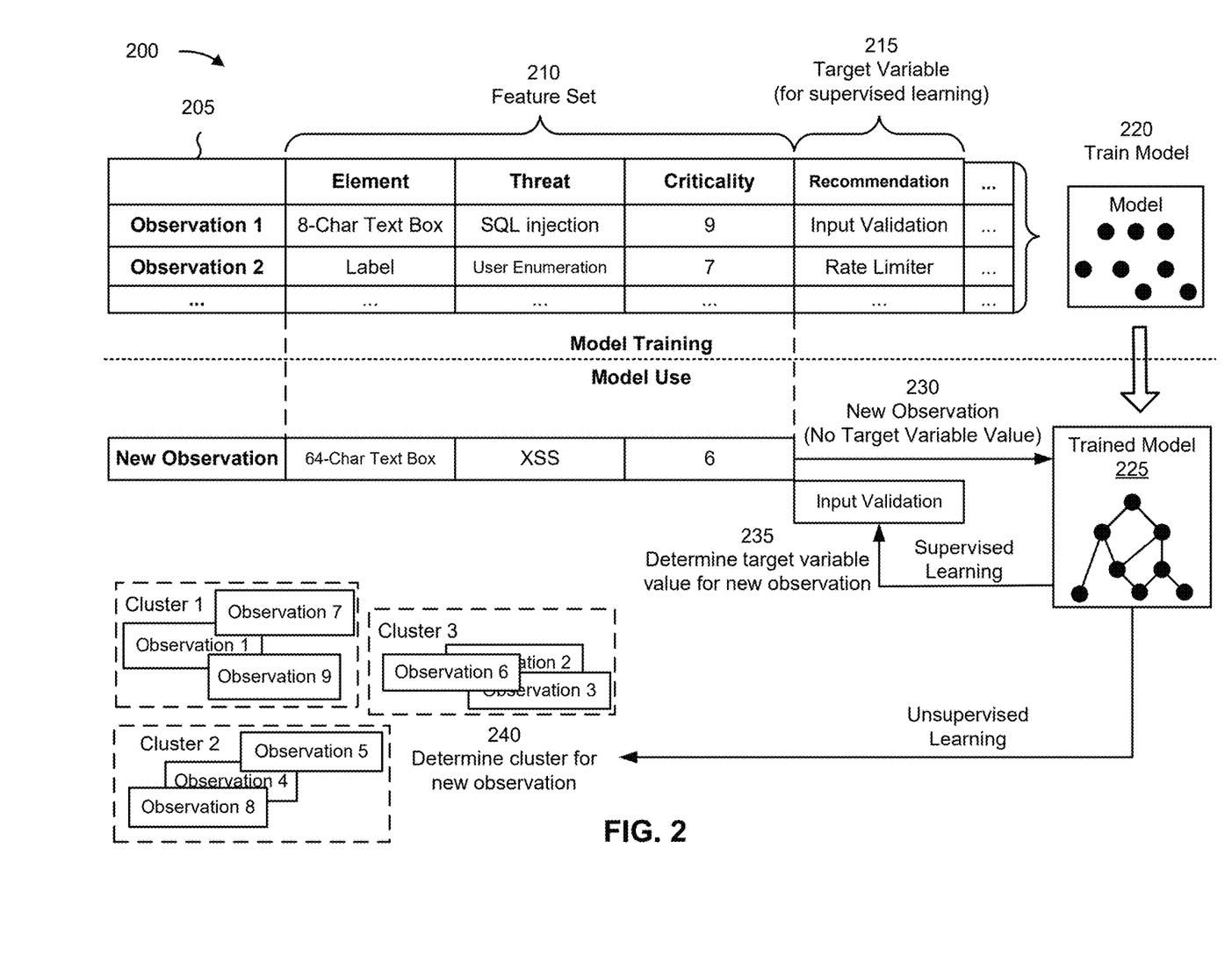
FIG. 2 is a diagram illustrating an example of training and using a machine learning model in connection with a security engine for application deployment pipelines, in accordance with some embodiments of the present disclosure.

FIG. 2 is a diagram illustrating an example 200 of training and using a machine learning model in connection with a security engine for application deployment pipelines. The machine learning model training and usage described herein may be performed using a machine learning system. The machine learning system may include or may be included in a computing device, a server, a cloud computing environment, or the like, such as the security system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a data source device, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the data source device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of an application element, a second feature of a type of threat, a third feature of a criticality level, and so on. As shown, for a first observation, the first feature may have a value of "8-Char Text Box", the second feature may have a value of "SQL injection", the third feature may have a value of "9", and so on. These features and feature values are provided as examples, and may differ in other examples. For example, the feature set may include one or more of the following features: elements of a security or privacy policy, a type of system on which an application si to be deployed, or a set of recommendations that can be provided, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a recommendation for modifying program code of an application, which has a value of "Input Validation" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may use a decision tree algorithm to select a recommendation of a set of recommendations. Additionally, or alternatively, the machine learning system may use a support vector machine algorithm to classify a segment of program code into a particular group associated with a particular recommendation. After training, the machine learning system may store the machine learning model as a trained machine learning model 225 to be used to analyze new observations.

As an example, the machine learning system may obtain training data for the set of observations based on parsing program code, security policies, data structures storing different versions of program code (e.g., from which the machine learning system may extract recommendations of changes to program code to improve the program code and mitigate or resolve a security issue), or parsing documentation of program code, among other examples.

As shown by reference number 230, the machine learning system may apply the trained machine learning model 225 to a new observation, such as by receiving a new observation and inputting the new observation to the trained machine learning model 225. As shown, the new observation may include a first feature of an application element, a second feature of a type of threat, a third feature of a criticality, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "Input Validation" for the target variable of providing a recommendation for mitigating a security issue for the new observation, as shown by reference number 235. Based on this prediction, the machine learning system may provide a first recommendation, may provide output for determination of a first recommendation, may perform a first action, and/or may cause a first action to be performed (e.g., by instructing another device to perform the action), among other examples. The first recommendation may include, for example, implementing a particular change to program code. The first action may include, for example, generating program code and inserting the generated program code into an application source code.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first type of issue that can be mitigated by a first type of change to program code of an application), then the machine learning system may provide a first recommendation, such as the first recommendation described above. Additionally, or alternatively, the machine learning system may perform a first action and/or may cause a first action to be performed (e.g., by instructing another device to perform the action) based on classifying the new observation in the first cluster, such as the first action described above.

In some implementations, the recommendation and/or the action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include results of executing program code of an application, results from an escalated review of a program, feedback provided via a user interface by a user using the machine learning model, or monitoring data sources providing updated security information, policies, or regulations, among other examples.

In this way, the machine learning system may apply a rigorous and automated process to analyze program code. The machine learning system may enable recognition and/or identification of tens, hundreds, thousands, or millions of features and/or feature values for tens, hundreds, thousands, or millions of observations, thereby increasing accuracy and consistency and reducing delay associated with analyzing program code relative to requiring computing resources to be allocated for tens, hundreds, or thousands of operators to manually analyze program code using the features or feature values.

As indicated above, FIG. 2 is provided as an example. Other examples may differ from what is described in connection with FIG. 2.

Figure 3:
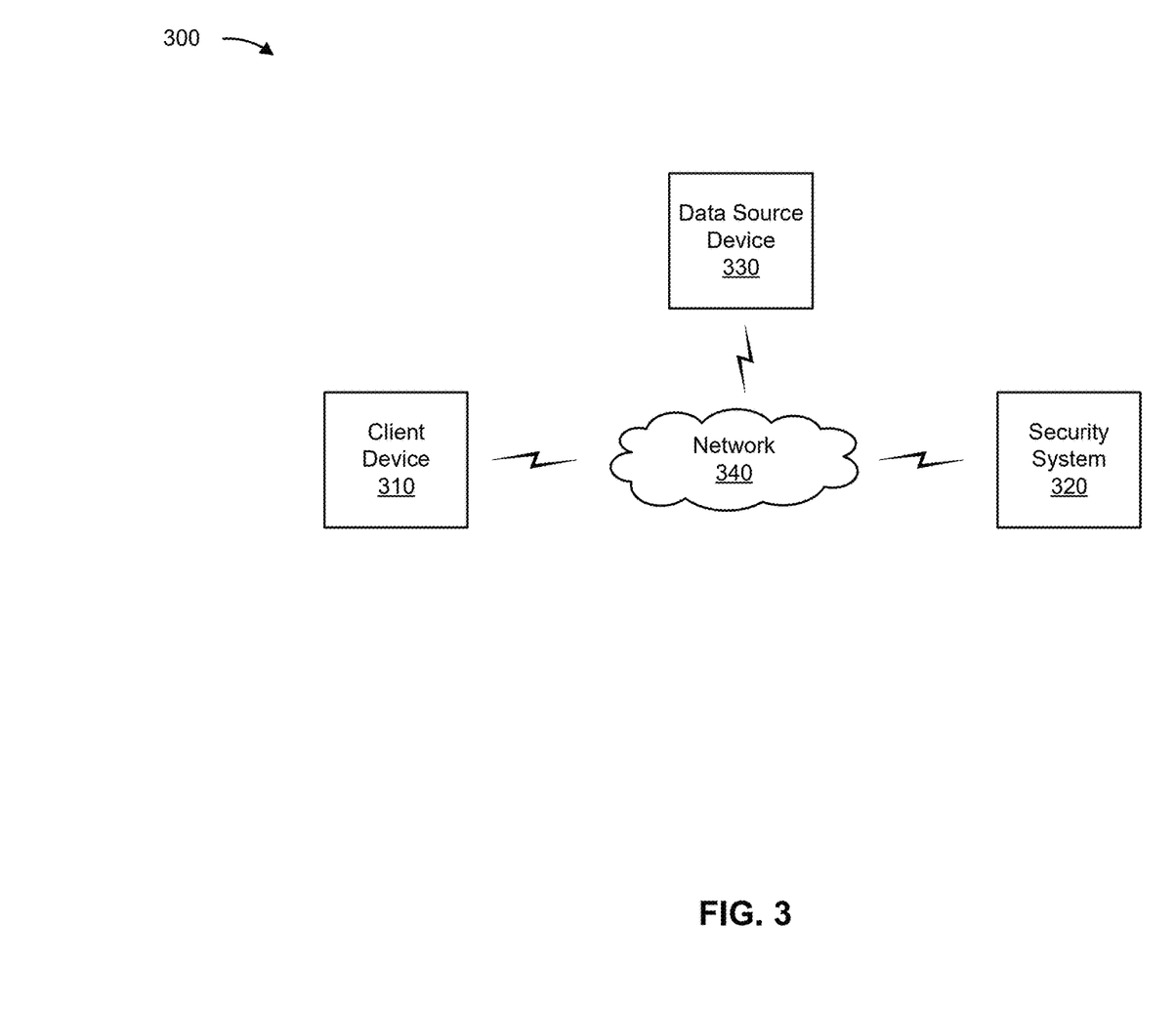
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a client device 310, a security system 320, a data source device 330, and a network 340. Devices of environment 300 may interconnect via wired connections, wireless connections, or a combination of wired and wireless connections.

The client device 310 may include one or more devices capable of receiving, generating, storing, processing, and/or providing information associated with using a security system, as described elsewhere herein. The client device 310 may include a communication device and/or a computing device. For example, the client device 310 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The security system 320 may include one or more devices capable of receiving, generating, storing, processing, providing, and/or routing information associated with analyzing code for security issues, as described elsewhere herein. The security system 320 may include a communication device and/or a computing device. For example, the security system 320 may include a server, such as an application server, a client server, a web server, a database server, a host server, a proxy server, a virtual server (e.g., executing on computing hardware), or a server in a cloud computing system. In some implementations, the security system 320 may include computing hardware used in a cloud computing environment.

The data source device 330 may include one or more devices capable of receiving, generating, storing, processing, and/or providing information associated with a security system, as described elsewhere herein. The data source device 330 may include a communication device and/or a computing device. For example, the data source device 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source device 330 may communicate with one or more other devices of environment 300, as described elsewhere herein.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
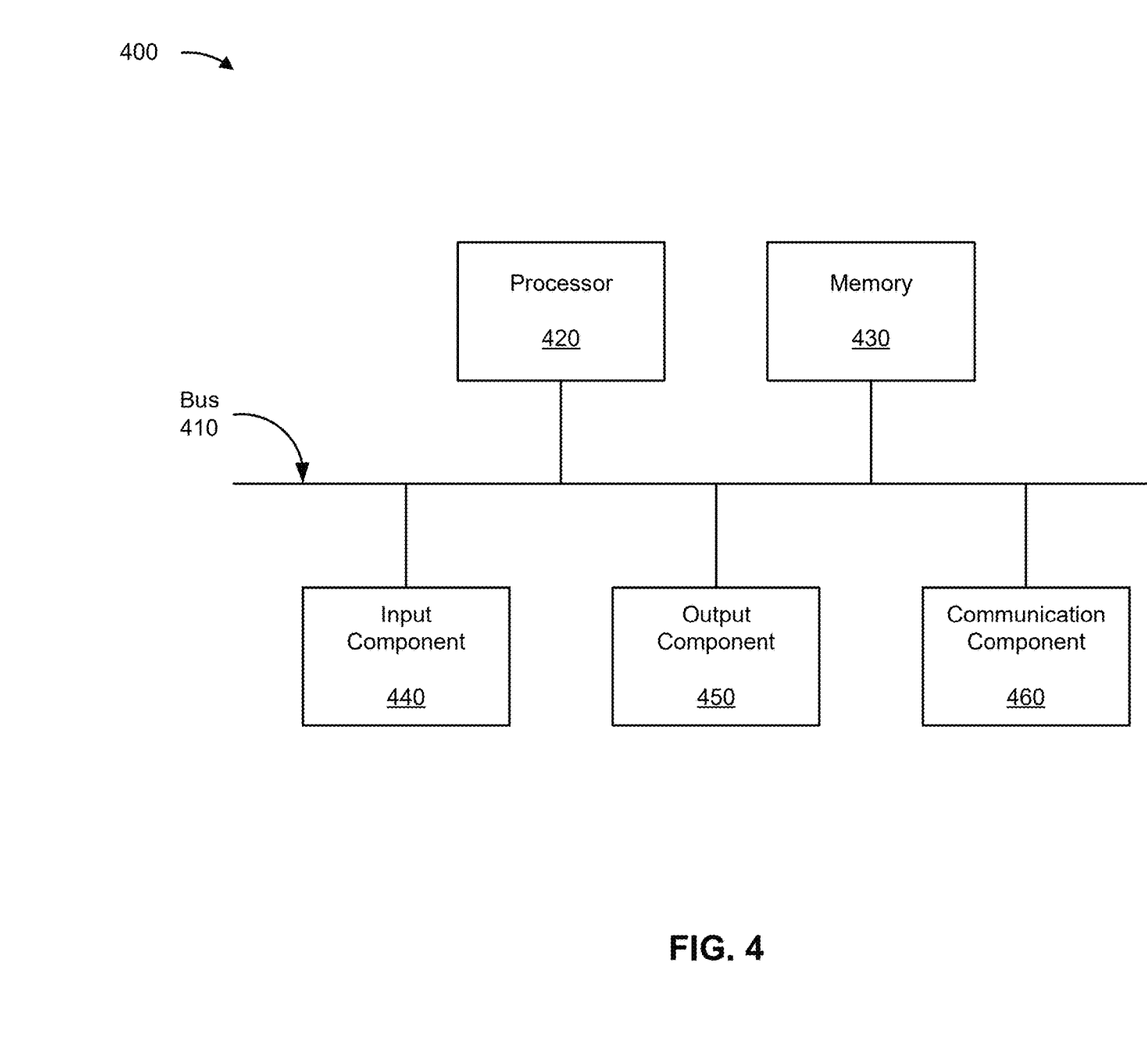
FIG. 4 is a diagram of example components of a device associated with providing a security engine for application deployment pipelines, in accordance with some embodiments of the present disclosure.

FIG. 4 is a diagram of example components of a device 400 associated with providing a security engine for application deployment pipelines. The device 400 may correspond to client device 310, security system 320, and/or data source device 330. In some implementations, client device 310, security system 320, and/or data source device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
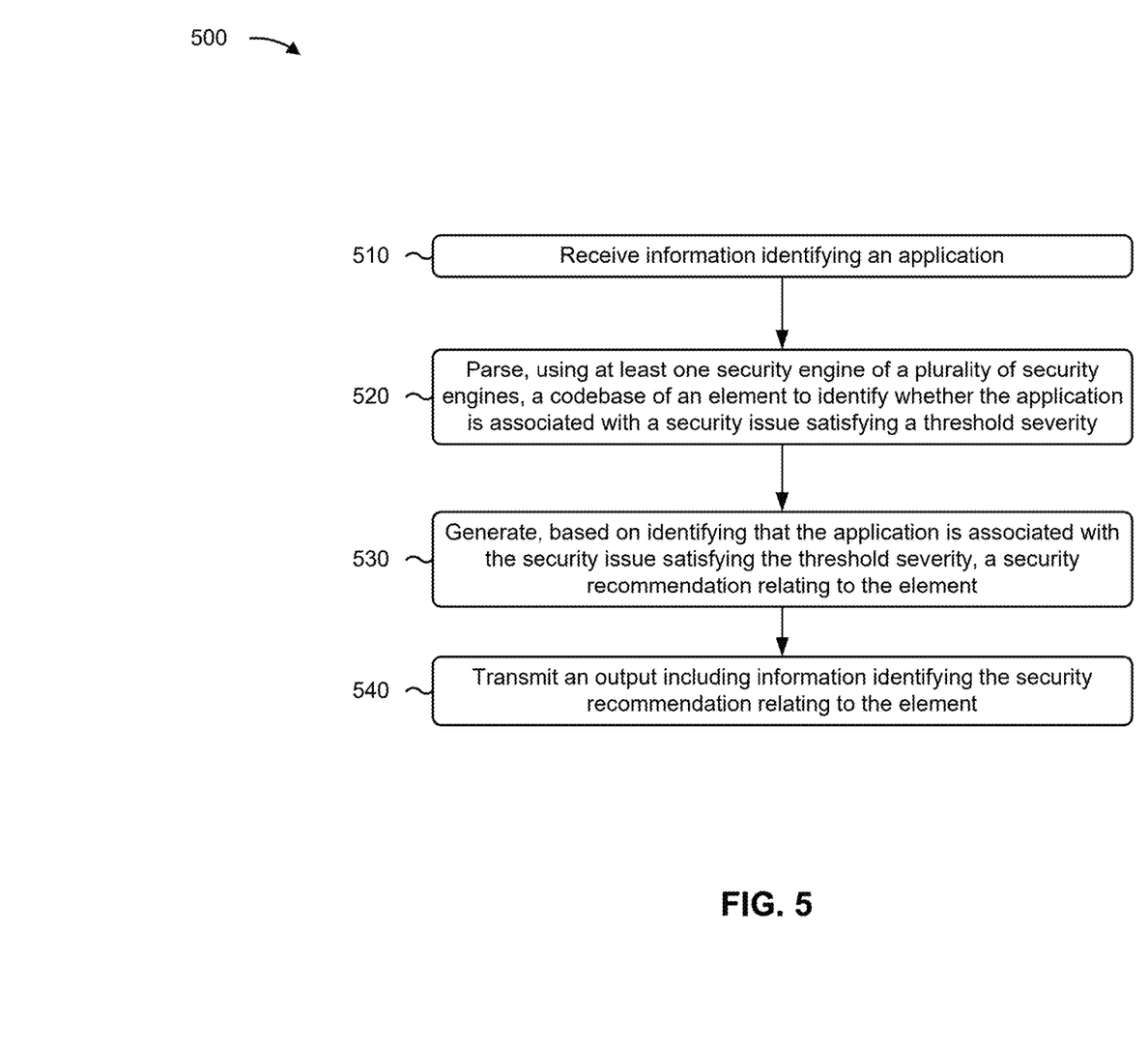
FIG. 5 is a flowchart of an example process associated with security engine for application deployment pipelines, in accordance with some embodiments of the present disclosure.

FIG. 5 is a flowchart of an example process 500 associated with security engine for application deployment pipelines. In some implementations, one or more process blocks of FIG. 5 may be performed by the security system 320. In some implementations, one or more process blocks of FIG. 5 may be performed by another device or a group of devices separate from or including the security system 320, such as the client device 310 and/or the data source device 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving information identifying an application (block 510). For example, the security system 320 (e.g., using processor 420, memory 430, input component 440, and/or communication component 460) may receive information identifying an application, the information identifying the application including information identifying a design of a set of elements of the application, and each element, of the set of elements, being associated with a corresponding codebase, as described above in connection with reference number 150 of FIG. 1A. As an example, the security system may monitor authoring of an application via a drag-and-drop GUI that is provided by the security system.

As further shown in FIG. 5, process 500 may include parsing, using at least one security engine of a plurality of security engines, a codebase of an element, of the set of elements, to identify whether the application is associated with a security issue satisfying a threshold severity (block 520). For example, the security system 320 (e.g., using processor 420 and/or memory 430) may parse, using at least one security engine of a plurality of security engines, a codebase of an element, of the set of elements, to identify whether the design the application is associated with a security issue satisfying a threshold severity, as described above in connection with reference numbers 152 and 154 of FIGS. 1A and 1B. As an example, the security system may execute a set of security engines to identify security issues in the design of the application and may evaluate the security issues to determine whether any security issues satisfy a threshold level of severity.

As further shown in FIG. 5, process 500 may include generating, based on identifying that the application is associated with the security issue satisfying the threshold severity, a security recommendation relating to the element (block 530). For example, the security system 320 (e.g., using processor 420 and/or memory 430) may generate, based on identifying that the application is associated with the security issue satisfying the threshold severity, a security recommendation relating to the element, as described above in connection with reference number 156 of FIG. 1B. As an example, the security system may generate, for a SQL injection threat, a recommendation to incorporate program code performing input validation on any inputs received via a user interface element of an application.

As further shown in FIG. 5, process 500 may include transmitting an output including information identifying the security recommendation relating to the element (block 540). For example, the security system 320 (e.g., using processor 420, memory 430, and/or communication component 460) may transmit an output including information identifying the security recommendation relating to the element, as described above in connection with reference numbers 156-160 of FIGS. 1B and 1C. As an example, the security system may provide a document identifying a recommendation, receive a confirmation of the recommendation from an author of an application, and may update program code of the application to incorporate the recommendation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for application security management, the system comprising:
    one or more memories; and
    one or more processors, communicatively coupled to the one or more memories, configured to:
        receive information identifying an application,
            the information identifying the application including information identifying a design of a set of elements of the application, and
            each element, of the set of elements, being associated with a corresponding codebase;
        parse, using at least one security engine of a plurality of security engines, a codebase of an element, of the set of elements, to identify whether the design of the application is associated with a security issue satisfying a threshold severity,
wherein the plurality of security engines include:
a design system engine associated with evaluating the element in connection with a design system specification for the application; and
a code engine associated with evaluating a potential vulnerability of one or more functions of the codebase of the element;
generate, based on identifying that the application is associated with the security issue satisfying the threshold severity, a security recommendation relating to the element; and
transmit an output including information identifying the security recommendation relating to the element.

2. The system of claim 1, wherein the plurality of security engines includes a compliance engine associated with evaluating the element in connection with a compliance specification for the application.

3. The system of claim 1, wherein the plurality of security engines includes a privacy engine associated with evaluating the element in connection with one or more privacy requirements.

4. The system of claim 1, wherein the one or more processors, when configured to transmit the output, are configured to:
transmit a report identifying the security issue and the security recommendation.

5. The system of claim 1, wherein the one or more processors, when configured to transmit the output, are configured to:
transmit an instruction to automatically modify the codebase of the element to resolve the security issue.

6. The system of claim 1, wherein the one or more processors are further configured to:
maintain a communication pipeline with one or more databases storing security information;
detect, using the communication pipeline, a change to the one or more databases; and
update a security engine, of the plurality of security engines, based on the change to the one or more databases.

7. The system of claim 1, wherein the one or more processors are further configured to:
parse one or more attributes of the element and the codebase of the element to generate the security recommendation or an efficiency recommendation.

8. The system of claim 1, wherein the one or more processors, when parsing the codebase of the element, are configured to:
parse the codebase of the element based on receiving a user input associated with specifying the element of the set of elements.

9. A non-transitory computer-readable medium storing a set of instructions, the set of instructions comprising:
one or more instructions that, when executed by one or more processors of a device for application security management, cause the device to:
receive information identifying an application,
the information identifying the application including information identifying a set of elements of the application, and
each element, of the set of elements, being associated with a corresponding codebase;
parse, using at least one security engine of a plurality of security engines, a codebase of an element, of the set of elements, to identify whether the application is associated with a security issue satisfying a first threshold severity or an efficiency issue satisfying a second threshold severity,
wherein the plurality of security engines include:
a design system engine associated with evaluating the element in connection with a design system specification for the application; and
a code engine associated with evaluating a potential vulnerability of one or more functions of the codebase of the element;
generate, based on identifying that the application is associated with the security issue satisfying the first threshold severity or the efficiency issue satisfying the second threshold severity, a security recommendation relating to the element or an efficiency recommendation relating to the element; and
transmit an output including information identifying the security recommendation or the efficiency recommendation.

10. The non-transitory computer-readable medium of claim 9, wherein the one or more instructions further cause the device to:
receive information identifying one or more attributes of the element; and
wherein the one or more instructions, that cause the device to generate the security recommendation or the efficiency recommendation, cause the device to:
parse the one or more attributes of the element and the codebase of the element to generate the security recommendation or the efficiency recommendation.

11. The non-transitory computer-readable medium of claim 10, wherein the efficiency recommendation is related to at least one of:
a data storage associated with the element,
a signaling overhead associated with the element, or
a processing requirement associated with the element.

12. The non-transitory computer-readable medium of claim 9, wherein the one or more instructions, that cause the device to transmit the output, cause the device to:
transmit a report identifying the security issue and the security recommendation.

13. The non-transitory computer-readable medium of claim 9, wherein the one or more instructions, that cause the device to transmit the output, cause the device to:
transmit an instruction to automatically modify the codebase of the element to resolve the security issue.

14. The non-transitory computer-readable medium of claim 9, wherein the one or more instructions further cause the device to:
generate an application creation graphical user interface; and
wherein the one or more instructions, that cause the device to receive information identifying the application, cause the device to:
receive, via the graphical user interface, one or more user inputs associated with specifying the set of elements of the application.

15. The non-transitory computer-readable medium of claim 14, wherein the one or more instructions, that cause the device to parse the codebase of the element, cause the device to:
parse the codebase of the element based on receiving a user input, of the one or more user inputs, associated with specifying the element of the set of elements.

16. The non-transitory computer-readable medium of claim 9, wherein the one or more instructions further cause the device to:
  maintain a communication pipeline with one or more databases storing security information;
  detect, using the communication pipeline, a change to the one or more databases; and
  update a security engine, of the plurality of security engines, based on the change to the one or more databases.

17. A method for application security management, comprising:
  generating, by a device, an application creation graphical user interface;
  receiving, by the device and via the graphical user interface, one or more user inputs associated with specifying a set of elements of an application;
  information identifying the application including information identifying the set of elements of the application,
    each element, of the set of elements, being associated with a corresponding codebase;
  parsing, using at least one security engine of a plurality of security engines, a codebase of an element, of the set of elements, to identify whether the application is associated with a security issue satisfying a threshold severity,
  wherein the plurality of security engines include:
    a design system engine associated with evaluating the element in connection with a design system specification for the application; and
    a code engine associated with evaluating a potential vulnerability of one or more functions of the codebase of the element;
  generating, based on identifying that the application is associated with the security issue satisfying the threshold severity, a security recommendation relating to the element; and
  transmitting, by the device, an output including information identifying the security recommendation relating to the element.

18. The method of claim 17, further comprising:
  receiving information identifying one or more attributes of the element;
  parsing the one or more attributes of the element and the codebase of the element to generate an efficiency recommendation; and
  transmitting an output including information identifying the efficiency recommendation.

19. The method of claim 17, wherein transmitting the output comprises:
  causing one or more indicators of the security issue and the security recommendation to be displayed within the application creation graphical user interface.

20. The method of claim 17, wherein parsing the codebase of the element comprises:
  parsing the codebase of the element based on receiving a user input, of the one or more user inputs, associated with specifying the element of the set of elements.

* * * * *